United States Patent [19]

Steinle

[11] Patent Number: 5,044,727

[45] Date of Patent: * Sep. 3, 1991

[54] BEAM SPLITTER/COMBINER APPARATUS

[75] Inventor: Michael J. Steinle, Fort Collins, Colo.

[73] Assignee: Hewlett-Packard Company, Palo Alto, Calif.

[*] Notice: The portion of the term of this patent subsequent to Jul. 16, 2008 has been disclaimed.

[21] Appl. No.: 519,069

[22] Filed: May 3, 1990

[51] Int. Cl.[5] ............... G02B 27/14; G02B 5/28; G01J 3/50

[52] U.S. Cl. .................... 350/171; 350/173; 350/166; 250/226

[58] Field of Search ............. 350/171, 173, 174, 166; 250/226

[56] References Cited

U.S. PATENT DOCUMENTS 1,319,292 10/1919 Kunz .................. 350/173
1,371,970 3/1921 Furman ................ 350/173
4,870,268 9/1989 Vincent et al. .

Primary Examiner—Jon W. Henry

[57] ABSTRACT

An optical separator device for splitting a beam of incident polychromatic light into a plurality of spacially and spectrally separated component beams having parallel optical axes including a first composite for spectrally and spacially separating the incident beam into a first plurality of component beams and having a first plurality of parallel, spectrally selective, reflective layers including a layer adapted to reflect light in a first spectral range and a second spectral range; a second composite for further spectrally and spacially separating the first plurality of component beams into a second plurality of component beams and having a second plurality of parallel, spectrally selective, reflective layers including a layer adapted to reflect light in the spectral range and to transmit light in the second spectral range.

20 Claims, 5 Drawing Sheets

BEAM SPLITTER/COMBINER APPARATUS

BACKGROUND OF THE INVENTION

The present invention relates generally to color imaging assemblies which employ multiple, spectrally selective, reflective layers for generating spacially separated, color component images of an object on an image plane and also to color combiners which employ multiple, spectrally selective, reflective layers for combining separate beams of light of different spectral ranges into a single combined beam. The invention relates particularly to an arrangement of optical coatings which reduces the number of spaced-apart reflective layers which are required to produce focused beam separation or beam combination.

The phrase "beam of light" is sometimes narrowly defined to mean a bundle of parallel light rays such as those generated by a collimated light source. The phrase "beam of light" may also be more broadly defined to mean any narrow shaft of light having light rays traveling in the same general direction. Used in this broader sense, the light which emanates from an object and passes through the aperture of an imaging lens as well as the converging cone of light which emerges from the lens and which is focused on an image plane may be collectively referred to as a "beam of light." When the phrase "beam of light" is used herein, it is to be understood that this broader meaning is intended.

Vincent, U.S. Pat. No. 4,709,144 and Vincent et al., U.S. Pat. No. 4,870,268, which are hereby specifically incorporated by reference for all that is disclosed therein, describe a number of different dichroic composites which are used in beam splitter assemblies and beam combiner assemblies. An optical scanner which employs a beam splitter is described in commonly assigned U.S. patent application Ser. No. 383,463 filed July 20, 1989, for OPTICAL SCANNER of David Wayne Boyd which is hereby specifically incorporated by reference for all that it discloses. A component beam path length compensator is described in commonly assigned U.S. patent application Ser. No. 498,865 filed Mar. 23, 1990, for BEAM SPLITTER/COMBINER WITH PATH LENGTH COMPENSATOR of Michael John Steinle, which is hereby specifically incorporated by reference for all that it discloses.

Certain prior art beam splitter assemblies which are disclosed in U.S. Pat. Nos. 4,709,144 and 4,870,268 will now be briefly described with reference to FIGS. 1-4.

FIG. 1 is a schematic side elevation view of a line-focus-type color imaging assembly comprising a line object 1 which originates a polychromatic light beam 4 which passes through an imaging lens 6 which is adapted to focus a line image of the line object on an image plane II located at a fixed optical path length distance from the imaging lens 6. The light beam 4 impinges upon a dichroic beam splitter 56 which splits the polychromatic light beam 4 into spectrally and spacially separated color component beams 8, 9, 10 which provide focused color component images of the line object on a monolithic photosensor unit 11, FIGS. 1 and 2, positioned at the image plane II.

FIG. 1 illustrates the manner in which two optically flat transparent optical support media 60 and 62 can be attached to provide three substantially equally spaced dichroic coatings to produce three substantially parallel optical component beams 8, 9, 10 that are both spacially and spectrally separated. The optical separator 56 consists of precisely ground and polished glass plates 60 and 62 coated on one or both faces with dichroic coatings 50, 52 and 54. At each dichroic coating 50, 52 and 54, incident light is either reflected or transmitted according to wavelength with negligible absorption loss. The composition of the dichroic coatings 50, 52 and 54 can be designed for accurate bandpass filtration.

The plate 60, shown in FIG. 1, is designed such that incident light striking dichroic coating 50 at 45° reflects blue light (approximately 400-500 nm) while transmitting red light and green light.

Plate 62, shown in FIG. 1, is coated on both faces with dichroic coatings 52 and 54 such that an incident polychromatic light beam 4 striking a first dichroic coating 52 at nominally 45° reflects the red spectral band (e.g., 600-700 nm) while transmitting the green band. The green light striking a second dichroic coating 54 and having an optical axis oriented nominally 45° from the dichroic coating is reflected. The reflected green light is caused to pass back through the glass plate 62 and through the other dichroic coatings 52 and 50 at a 45° angle. As shown in FIG. 1, each of the color components 8, 9 and 10 of the incident light are reflected at 90° to incoming beam 4. The reflected red and green components 9 and 8 are parallel and separated from each other by a distance determined by the glass plate 62 and dichroic coating thickness 52, the index of refraction of plate 62, and the angle of incidence. Similarly, the blue and red components 10 and 9 are separated by a distance determined by the thickness of the glass plate 60, dichroic coating 50, the index of refraction of the plate 60 and the angle of incidence.

A mirror coating could be substituted for the third dichroic coating 54, since only the third remaining color component reaches that coating interface.

A suitable photosensor unit 11 for use with optical separator 56 is shown in FIG. 2. Photosensor 11 may be a single chip, single package solid state device having three linear photosensor arrays, 12, 13 and 14, precisely aligned and spaced to coincide with the focused line images formed by beams 8, 9 and 10, respectively, shown in FIG. 1.

As illustrated in FIG. 1, light in each of the color component beams 8, 9, 10 travels a different optical path length through the beam splitter 56. As a result in the differences in component beam light path length through beam splitter 56, photosensor unit 11 is skewed at an angle theta relative to a component beam normal plane such that the total optical path lengths of each of the different color components, as measured from lens 6 to the photosensor unit 11, are equal. Angle theta and the distance "D" between linear photosensor arrays 13, 14 are functions of glass plate and dichroic layer thickness X and index of refraction.

FIG. 3 shows a beam splitter/photosensor arrangement which enables photosensor 11 to be positioned perpendicular to the optical axes of the color-separated beams. In this arrangement, the path-lengths-through-glass of the color-separated beams are made equal by the reciprocal arrangement of trichromatic beam splitters 56 and 58.

As shown in FIG. 3, the incident light beam 4 is aligned to impinge the hypotenuse face 32 of right angle prism 51 at a normal angle and transmit therein to a first base side 30 of the prism 51 which the light beam impinges at 45°. The composite beam splitter 56 of FIG. 1 is attached thereto. A trichromatic separation of the red, green and blue spectral components of the incident light beam occurs as previously described. The three reflected component beams re-enter the prism 51 and are directed toward the second base side 34 of prism 51, each separated beam impinging the second base side 34 at 45° incidence. A second composite beam splitter 58 is attached to the second base side 34 of prism 51. The plates 60 and 62 and the dichroic coatings 50, 52 and 54 in beam splitters 56 and 58 are identical. However, the orientation of the composite beam splitters 56 and 58, and the multilayer dielectric coatings 50, 52 and 54 on each base side 30 and 34 of the prism 51 are reversed so that the path lengths of each component color beam entering and exiting the trichromatic prism beam splitter 59 are identical. That is, a component color beam, such as blue, reflects off the dichroic coating 50 on plate 60 located on base side 30. Next, the blue component reflects off the dichroic coating 50 on plate 60 located adjacent to base side 34. In a like manner, a red component color beam goes from middle filter 52 on base side 30 to middle filter 52 on base side 34, and the green component reflects off a backside filter 54 to a front side filter 54. Reflected beams from the trichromatic beam splitter 58 adjacent to base side 34 are directed out of prism 51. The beams are perpendicular to the hypotenuse side 32 and parallel to the incident light beam. The thickness of the beam splitter glass plates, 60 and 62, and the dichroic coatings, 50, 52 and 54, determine the separation of the reflected beams. Thus, the dual trichromatic beam splitter 59 provides an equal path length through the glass for all color components. Also, the light enters and leaves the prism at a normal angle of incidence.

Referring to FIG. 4, a fluorescent light source 22 illuminates the surface of an original document 21. A beam of imaging light from the original document is projected onto a beam splitter assembly, consisting of dichroic beam splitters 16 and 17, by lens 6. Beam splitters 16 and 17 are flat glass plates coated on one side with dichroic coatings 50 and 52, respectively. Beam splitter 16 is designed to reflect blue light while transmitting red and green spectral bands. The blue light is reflected to a first CCD linear-array photosensor 18, with beam splitter 16 tilted at 45° to the incident light beam 4. Beam splitter 17 reflects red light to a second CCD photodiode array sensor 20. The green line image passing through both beam splitter plates is captured by the third CCD photodiode array sensor 19. Beam splitter plate 17 is also aligned at 45° to the incident light beam 4, as shown. In this arrangement in which each linear photosensor array 18, 19, 20 is provided on a separate photosensor unit differences in optical path lengths of the color component beams through beam splitters 16, 17 are compensated by individually adjusting the positions of the different photosensor units.

U.S. Pat. No. 4,870,268 also discloses a dichroic layer device which comprises a transparent plate having two parallel planar surfaces which is mounted with one of the parallel surfaces positioned in parallel, adjacent relationship with the planar surface of an optical support medium by means of spacers which provide an air gap between the planar surface of the optical support medium and the adjacent planar surface of the plate. The two planar surfaces of the plate and the planar surface of the support medium are each coated with a different dichroic material adapted to reflect different spectral ranges of light. Such a spaced layer arrangement may thus be used to eliminate the need for one of the plates 60, 62 in each of the beam splitter components 56, 58 in a compound beam splitter assembly such as illustrated in FIG. 3.

In the construction of parallel reflective layer-type beam splitters such as illustrated in FIGS. 1 and 3, it is generally desirable, in order to maintain high optical quality in the separated component beams and also to provide a compact beam splitter assembly, to have a relatively small separation between the parallel dichroic layers in each dichroic composite. When a beam splitter is used in a color optical imaging device, it is necessary to provide at least three separate component beams, usually red, green and blue, for proper color imaging. Thus, in prior art beam splitters of the type adapted to produce parallel component light beams, e.g. FIGS. 1 and 3, at least three, parallel, spaced-apart, dichroic layers have been provided. In a compound beam splitter such as illustrated in FIG. 3, each of the component parallel layer beam splitter arrays comprises three spaced-apart dichroic layers. In such arrangements, even if one of the plates in each parallel layer array is replaced by an air gap, it is necessary to employ at least one relatively thin transparent plate for providing mounting surfaces for the different dichroic layers.

However, the use of such thin transparent plates has proved to be problematic. Due to the flexibility of such thin plates, it is difficult to maintain flatness of each surface and parallelism between the three reflective surfaces in a beam splitter composite. When a thin plate is adhered to another surface, discontinuities in the adhesion material tend to produce warping in the attached thin plate. When a thin plate is supported on spacers to provide an air gap between dichroic layers, the lack of rigidity of the plate and the fact that all points on the plate are not supported by the spacers tend to cause warping of the thin plate.

The optical imaging device illustrated in FIG. 3 is adapted to provide focused component images on a plane positioned perpendicular to the component light beams. Such an imaging device requires a total of six separate reflective layers, thus compounding the problems of keeping each of the light reflective layers flat and in proper relationship with the other layers.

SUMMARY OF THE INVENTION

The present invention provides unique beam splitter/combiner configurations which reduce the number of separate, spaced-apart, spectrally selective, light reflective layers which must be employed compared to prior art configurations. The present invention may be used to overcome problems of the prior art relating to the use of thin transparent plates in three-color optical imaging devices and the like.

The present invention may thus comprise an optical separator device for splitting a beam of incident polychromatic light into a plurality of spacially and spectrally separated component beams having parallel optical axes. The device includes a first parallel layer composite for spectrally and spacially separating the incident beam into a first plurality of component beams. The first composite comprises a first plurality of parallel, spectrally selective, reflective layers including a layer adapted to reflect light in a first spectral range and a second spectral range. The device includes a second parallel layer composite for further spectrally and spacially separating the first plurality of component beams into a second plurality of component beams. The second composite comprises a second plurality of parallel, spectrally selective, reflective layers including a layer adapted to reflect light in the first spectral range and to transmit light in the second spectral range.

The invention may also comprise a method for splitting a beam of incident polychromatic light into a plurality of spacially and spectrally separated component beams having parallel optical axes. The method comprises the steps of: spectrally and spacially separating the incident beam into a first plurality of component beams through use of a spectrally selective, reflective layer adapted to reflect light in a first spectral range and a second spectral range; and further spectrally and spacially separating the first plurality of component beams through use of a second spectrally selective, reflective layer positioned obliquely to the first layer and which is adapted to reflect light in the first spectral range and to transmit light in the second spectral range.

The present invention may also comprise an optical combiner device for combining a plurality of spacially and spectrally separated component beams having parallel optical axes into a single combined beam having a unitary optical axis. The device includes a first parallel layer composite for spectrally and spacially combining a first plurality of component beams into a second plurality of component beams. The first composite comprises a first plurality of parallel, spectrally selective, reflective layers including a layer adapted to reflect light in a first spectral range and to transmit light in a second spectral range. The device includes a second parallel layer composite for spectrally and spacially combining the second plurality of component beams into the combined beam. The second composite comprises a second plurality of parallel, spectrally selective, reflective layers including a layer adapted to reflect light in the first spectral range and the second spectral range.

The present invention may also comprise a method for combining a plurality of spacially and spectrally separated component beams having parallel optical axes into a single combined beam having a unitary optical axis. The method comprises the steps of: spectrally and spacially combining a first plurality of component beams into a smaller second plurality of component beams through use of a first spectrally selective, reflective layer adapted to reflect light in a first spectral range and to transmit light in a second spectral range; and spectrally and spacially combining the second plurality of component beams into the single combined beam through use of a second spectrally selective, reflective layer positioned obliquely to the first layer and which is adapted to reflect light in the first spectral range and the second spectral range.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
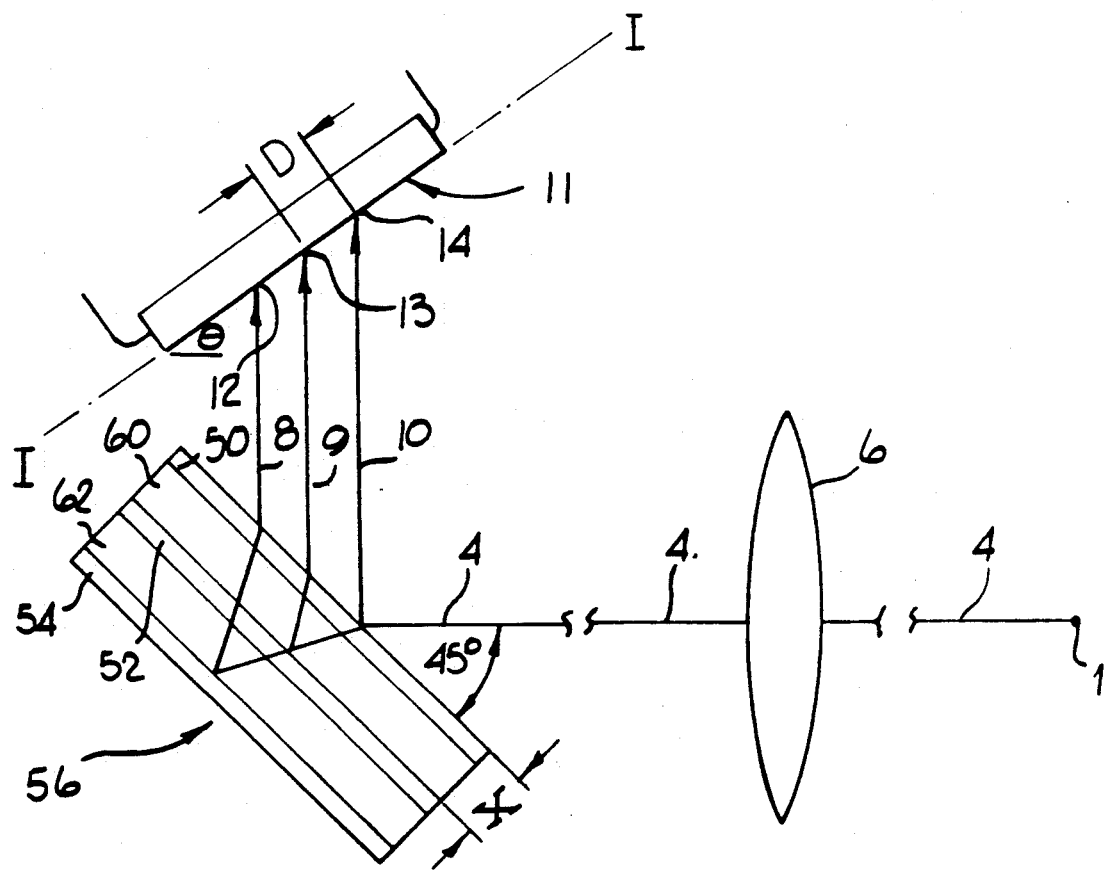
FIG. 1 is a side elevation view of a prior art color imaging assembly.
Figure 2:
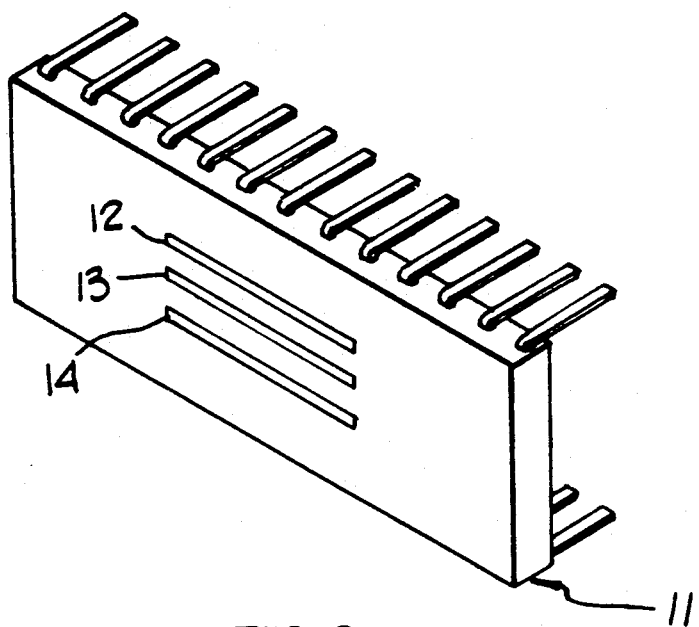
FIG. 2 is a perspective view of a prior art photosensor assembly.
Figure 3:
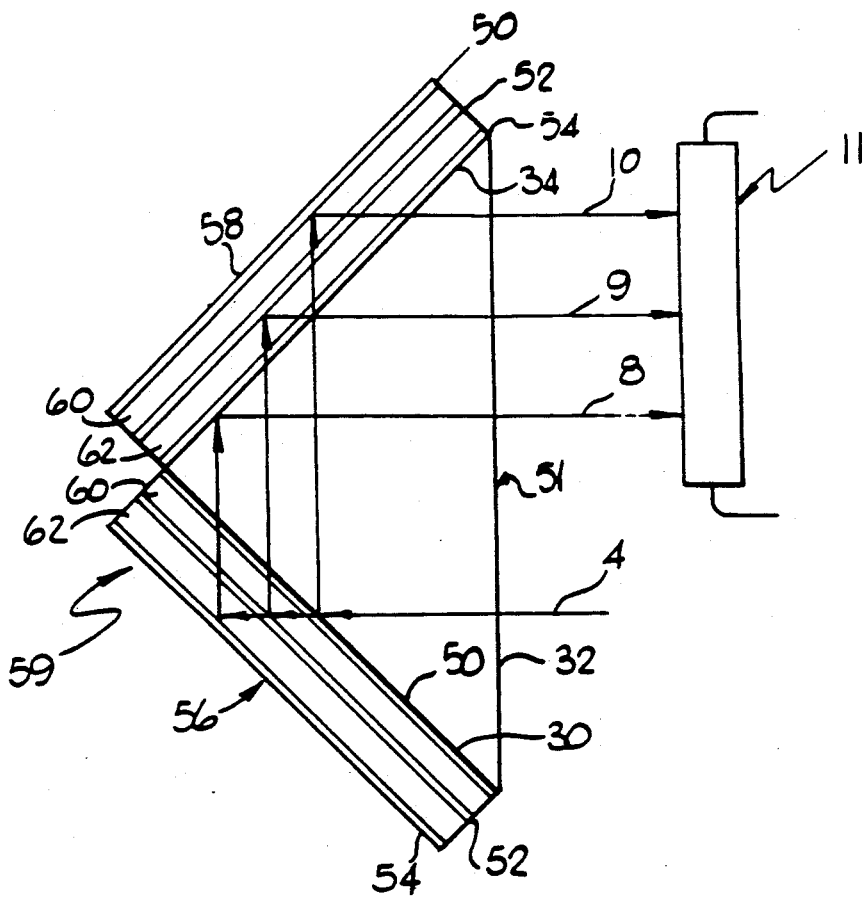
FIG. 3 is a side elevation view of a prior art dual trichromatic beam splitter assembly mounted on a prism.
Figure 4:
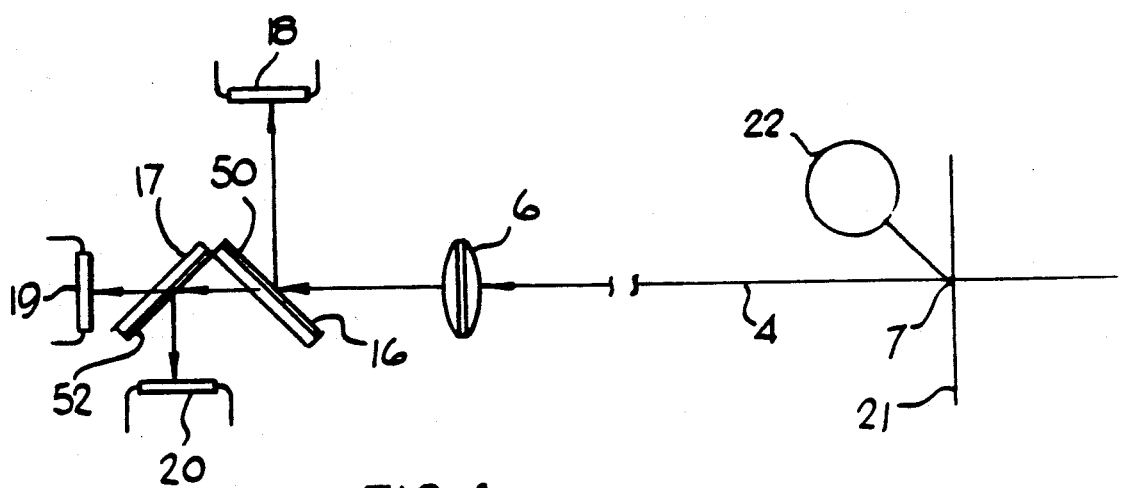
FIG. 4 is a side elevation view of a prior art color imaging assembly employing two beam splitter units and three separate photosensor units.
Figure 5:
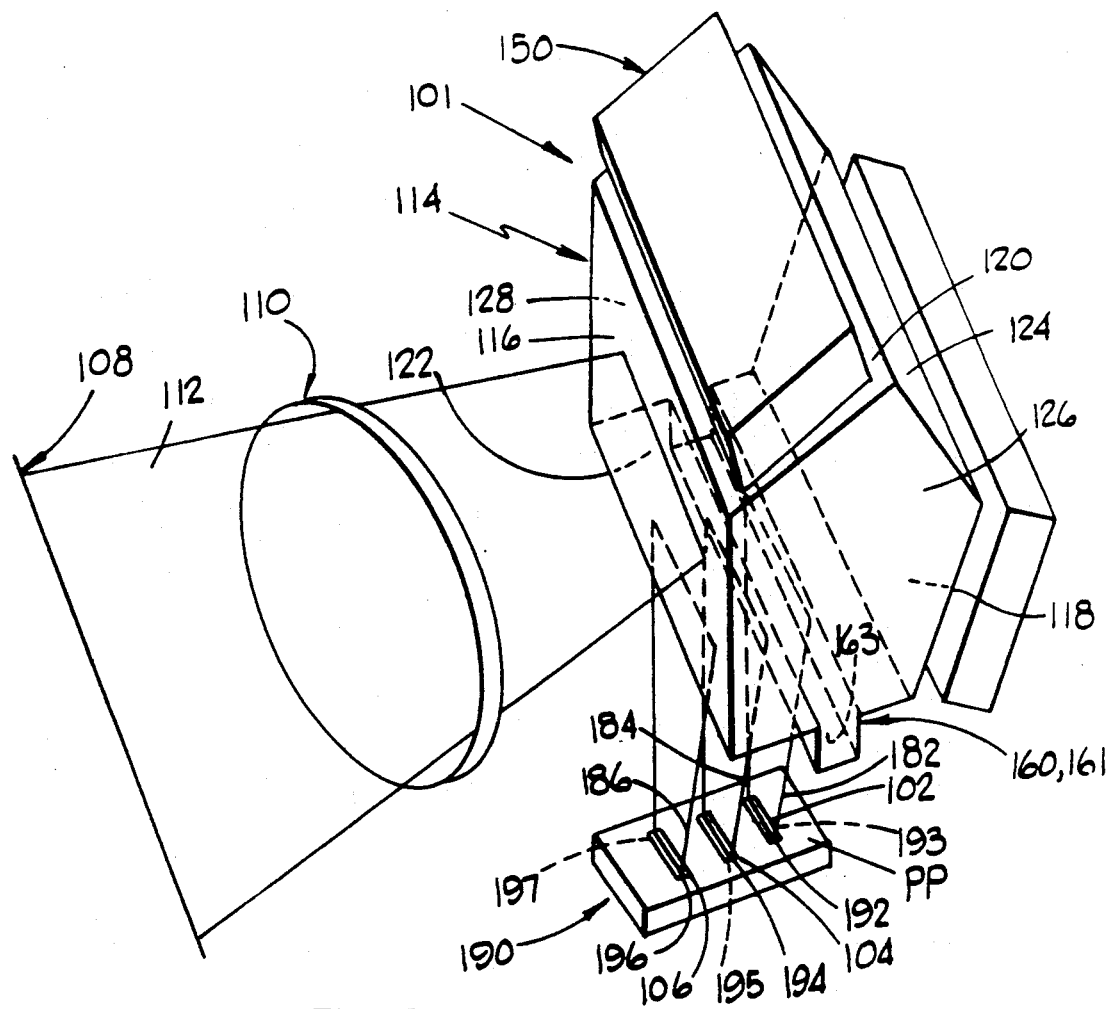
FIG. 5 is a perspective view of an optical imaging apparatus employing a multilayered beam splitter.
Figure 6:
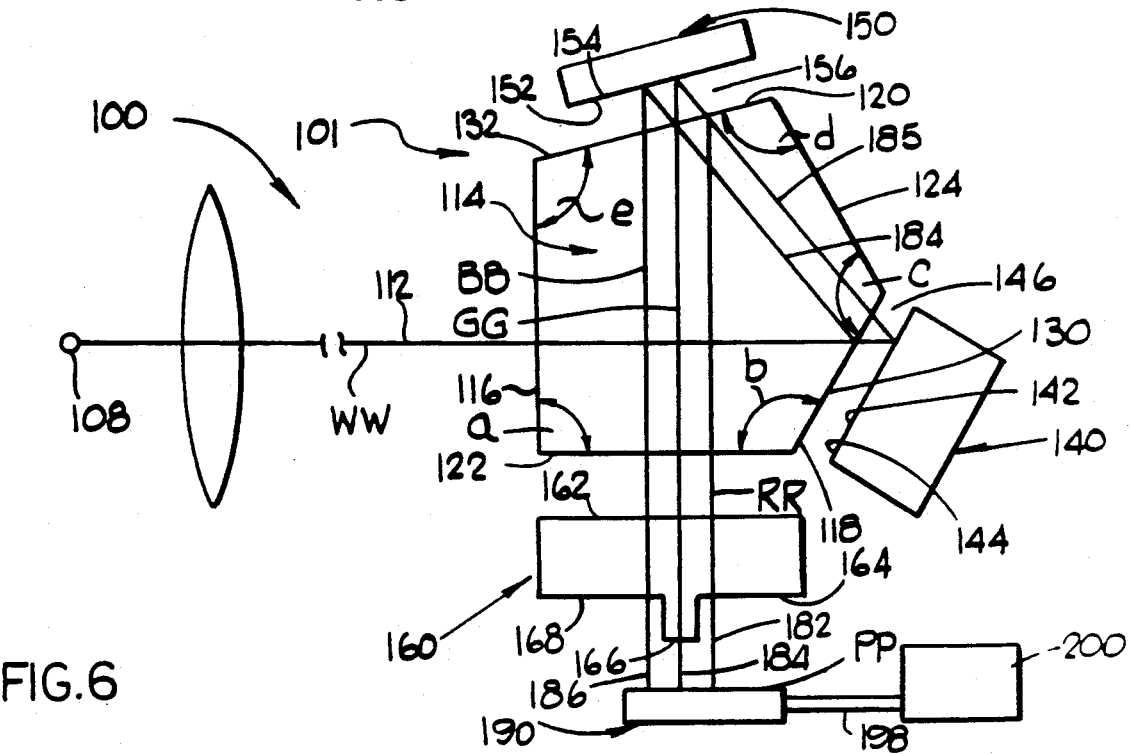
FIG. 6 is a side elevation view of the optical imaging apparatus of FIG. 5 provided with an alternative path length compensator configuration.

FIGS. 5 and 6 illustrate a color imaging assembly 100 which is adapted for providing spacially separated color component images 102, 104, 106 of an object 108, which may be the scan line of an optical scanner, on a unitary image plane PP.

An imaging lens assembly 110 convergingly transmits a polychromatic imaging light beam 112 (having an optical axis WW) from the object 108 to an optical separator device 10;. In the preferred embodiment of the invention illustrated in FIGS. 5 and 6 (which is presently the best mode contemplated), the optical separator device comprises a prism 114, a first rigid plate 140, and a second rigid plate 150 having predetermined surface portions thereof coated with predetermined, spectrally selective, reflective material. The optical separator device 101 separates the polychromatic imaging light beam 112 into component beams 182, 184, 186 which in one preferred embodiment comprise red, green and blue component beams having parallel, spaced-apart optical axes RR, BB, GG. A path length compensator 160 is provided for compensating for differences in the optical path length of the component beams. For purposes of clarity, in the illustrated embodiments, only the central planes of the imaging light beam 112 and the component beams 182, 184, 186 are shown. However, it is to be understood that these beams are converging beams of the type illustrated in U.S. patent application Ser. No. 383,463 and U.S. Pat. No. 4,870,268 incorporated by reference above.

In an embodiment of the invention, e.g. FIGS. 5 and 6, in which the color imaging assembly 100 is an optical scanner, the spacially separated color component images 102, 104, 106 are each projected onto a separate linear photosensor array 192, 194, 196 provided in coplanar relationship in a unitary photosensor assembly 190. The photosensor assembly 190 transmits data signals corresponding to the color component images as by data transmission cable 198 to a data processing and/or storage apparatus 200. An optical scanner structure of the type into which the color imaging assembly 100 may be incorporated is described in U.S. patent application Ser. No. 383,463 incorporated by reference above.

Prism 114 comprises a first, second, third, fourth, and fifth side faces 116, 118, 120, 122, 124 which extend at right angles between opposite, identically-shaped, irregular-pentagon-shaped end faces 126, 128. In one preferred embodiment of the invention which is adapted for imaging a scan line 108 having a length of 216 mm and in which the imaging lens assembly 110 comprises a double Gauss lens having the following parameters: object distance, 357.1 mm; focal length; 42.57 mm; aperture f/number, 5.3; transverse magnification, −0.126091; entrance pupil radius, 4.000 mm; and in which the first face 116 of the prism 114 is positioned normal to the optical path of the imaging light beam 112 and is located at a distance of 391 mm from object 108 as measured along light path 112. The length of each side face, as measured between the end faces, may be 27.2 mm; the height of the first face 116 may be 2.5 mm; the height of the second face 118 may be 2.5 mm; the height of the third face 120 may be 2.0 mm; the height of the fourth face 122 may be 1.8 mm; and the height of the fifth face 124 may be 0.7 mm. Angles a, b, c, d, and e may be 90°, 112.5°, 112.5°, 112.5°, and 112.5°, respectively. As used herein, the height of each face refers to the dimension of the face measured perpendicular to its length.

A surface coating 130 which is adapted to reflect blue light and transmit other spectral ranges of light is applied to the second side face 118 of the prism. Coating 130 may comprise a blue light reflecting dichroic coating having a thickness of approximately 0.002 mm. The surface of the third side face 120 of the prism is provided with a surface coating 132 which is adapted to reflect red light and to transmit other spectral ranges of light. Surface coating 132 may comprise a dichroic coating having a thickness of 0.002 mm.

A first rigid plate 140 which may have a thickness of, e.g., 2.1 mm, a length of, e.g., 25 mm, and a width of, e.g., 2.5 mm is mounted in fixed relationship with prism 114 opposite second side face 118. The first rigid plate 140 comprises a planar surface 142 which is positioned adjacent and parallel to prism face 118. Planar surface 142 has a surface coating 144 applied thereto which is adapted to reflect red light and green light and which is adapted to transmit other spectral ranges of light. Coating 144 may be a dichroic coating having a thickness of, e.g. 0.002 mm. Planar surface 142 is separated from prism face 118 by an air gap 146 having a dimension measured perpendicular to the two planar surfaces of, e.g., 0.15 mm.

A second rigid plate 150 which may be identical in construction to plate 140 is positioned in fixed relationship with prism 114 opposite third prism side face 120. Rigid plate 150 has a planar surface 152 positioned parallel and adjacent to prism side face 120. Surface 152 has a surface coating 154 applied thereto which is adapted to reflect blue and green light and which is adapted to transmit other spectral ranges of light, i.e. red light. Planar surface 152 is separated from third prism face 120 by an air gap 156 having a gap distance which may be selected to provide equal spacing between component beams, e.g. 0.15 mm.

A compensator 160, which in the illustration in FIG. 6 comprises a block separated from the prism 114 by an air gap 170, comprises a top surface 162 positioned perpendicular to prism face 122 and comprises first, second and third planar lower surface portions 164, 166, 168 which are also positioned perpendicular to prism face 122. Second surface 166 is positioned lower than first and third lower surface portions 164, 168. First surface portion 164 is adapted to intersect the red component light beam 182, second lower surface portion 166 is adapted to intersect the green component light beam 184, and third lower surface portion 168 is adapted to intersect the blue component light beam 186. The different relative elevation of surface 166 from that of surfaces 164 and 168 is adapted to compensate for the relatively longer light path of the green component beam 184 through the prism 114 as opposed to the relatively shorter path lengths of the red component beam 182 and the blue component beam 186, which are identical in path length.

Alternately, as illustrated in FIG. 5, path length compensator 160 may comprise a parallelepiped-shaped block 161 which may be integrally formed with or separately formed and attached to the prism 114 and which has a lower surface 162 which is adapted to intersect only the green component beam 184, the red and blue component beams each exiting the prism through fourth prism face 122. The use and construction of step-type compensators such as compensator 160 are described in U.S. patent application Ser. No. 498,865 filed Mar. 23, 1990, of Michael John Steinle for BEAM SPLITTER/-COMBINER WITH PATH LENGTH COMPENSATOR, which is hereby specifically incorporated by reference for all that it discloses. In one preferred embodiment of the invention in which the prism and compensator 160 each have an index of refraction of 1.519; and in which the spacing between linear photosensor arrays 192 and 194 and between arrays 194 and 196 are each 200 microns; and in which air gaps 146, 156 are each 152 microns, the step thickness of compensator 160 is approximately 1,090 microns, i.e. the distance between surfaces 164 and 166 and between surfaces 168 and 166 in the embodiment of FIG. 6, or alternatively the distance of surface 163 from prism face 122 in embodiment of FIG. 5, is approximately 1,090 microns.

As previously mentioned, the optical separator device 101 is adapted to separate an incident beam 112 of polychromatic imaging light into parallel, spacially separated, component beams 182, 184, 186. The incident beam 112 initially impinges upon normal, uncoated or antireflective-coated prism face 116, passing therethrough without significant reflection of any spectral band. The imaging beam 112 next impinges upon coated surface 118 which reflects blue light to provide a first separated blue component beam 184. The remaining spectral components in light beam 112 next impinge upon surface coating 144 which reflects the remaining red and green spectral bands in a compound component beam 185. In a preferred embodiment of the invention, layer 142 comprises a mirror surface which may reflect all wavelengths of light but which only reflects red and green light of the impinging light beam due to the fact that the blue component beam has already been removed from the impinging light beam.

The blue component beam 184 reflected at surface 118 next passes through red reflective coating 132 on third prism side face 120, reflects from blue and green reflective layer 152 on plate surface 154, and thereafter is transmitted back through prism face 120, prism face 122, and compensator surfaces 162 and 168 prior to impinging upon linear photosensor array 196 on image plane PP.

The compound component beam 185 reflected from surface 144 passes back through prism face 118 and next impinges upon prism face 120 where a red component beam 182 is reflected by surface coating 132. The red component beam 182 thereafter passes through prism face 122, the upper surface 162 of compensator 160, and a lower surface portion 164 of compensator 160 before impinging upon associated linear photosensor array 192 on image plane PP. The green component 184 of compound component beam 185 passes through prism face 120 and is reflected by plate surface 154 which, in a preferred embodiment of the invention, is a mirror surface which reflects only blue and green light since all red light in the imaging beam has been previously reflected by red light reflective coating 132. The green component beam 184, subsequent to reflection at surface 152, is transmitted through surface 120 and surface coating 156, through surface 122, through path length compensator upper surface 162 and lower middle surface 166 and finally impinges upon liner photosensor array 194 located at image plane PP.

As previously mentioned, the component images 102, 104, 106 of the object 108 which are provided on the spaced-apart linear photosensor arrays 192, 194, 196 are converted by the photosensor arrays into electronic data by the photosensor assembly 190 and this data is transmitted by appropriate transmission devices such as data cable 198 to a data processing apparatus or storage apparatus 200 such as a microprocessor or the like. Conversion of an image of an object to electronic data by a photosensor array for storage or data processing purposes is well-known in the art.

As disclosed by Vincent, U.S. Pat. No. 4,870,268 and Steinle, U.S. patent application Ser. No. 498,865 incorporated by reference above, the various operating components of an optical imaging device may also be used in an inverse manner to provide a beam combiner assembly in which component beams of light are combined into a single beam of polychromatic light in which each of the combined component beams have coaxial axes. Such a beam combiner may be provided by the assembly of FIG. 6 by replacing the linear photosensor arrays 192, 194, 196 with linear light source arrays 193, 195, 197 as indicated with phantom lead lines in FIG. 5. In such a system, individual component beams 182, 184, 186 are combined by assembly 101 into a unitary polychromatic light beam 112 having a focus at 108. Beams 182 and 184 are combined by reflections at surfaces 120, 152, respectively, into a compound beam 185. Beam 186 which is reflected at surfaces 152 and 118, respectively, is combined with compound beam 185 which is reflected from surface 142 and combined with beam 186 at its point of reflection on surface 118. The difference in path length of component beam 184 from component beams 182 and 186 within assembly 101 are compensated for by compensator 160 such that all of the component beam portions of combined beam 112 have not only coaxial optical axes but also the same focus.

Each of the other beam separators described herein may also be used as beam combiners by replacing the respective photosensor arrays associated with each component beam of the beam splitter by a corresponding component beam light source. Each embodiment of the invention described herein is thus to be understood in the alternative, as constituting a beam combiner, even though separate reference numerals for each of the component beam light sources are not provided in the Figures other than FIG. 5.

Figure 7:
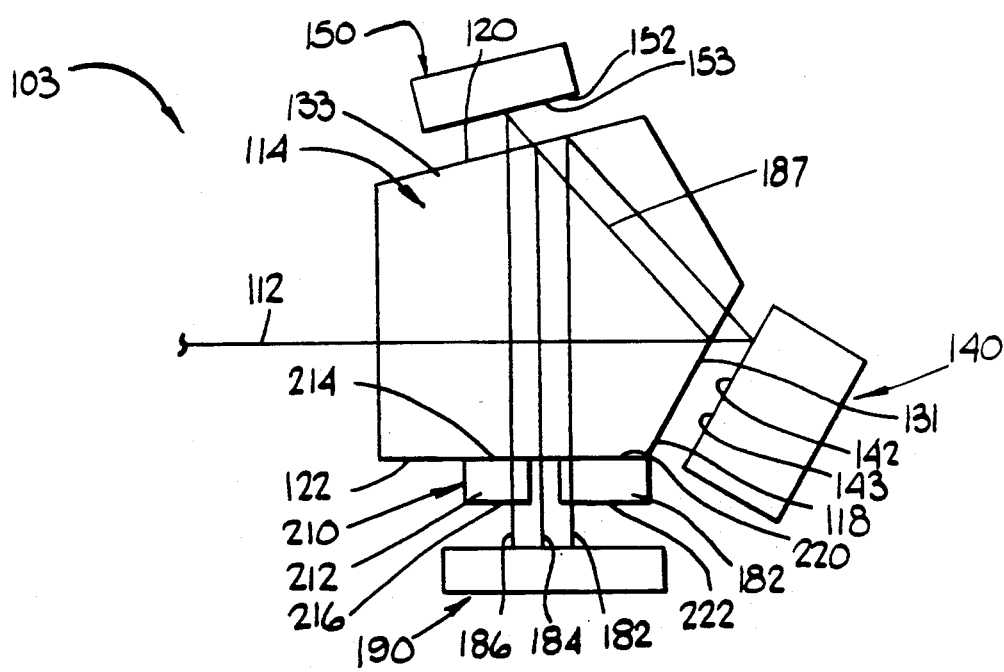
FIG. 7 is a side elevation view of a first alternative multilayered beam splitter device.

FIG. 7 illustrates a variation 103 of optical separator device 101 comprising a prism 114, a first rigid plate 140, and a second rigid plate 150 which may be identical in construction to those illustrated in FIG. 6. However, in optical separator device 103, prism surface 118 is coated with a blue and green reflective surface coating 131; surface 142 is coated with a red reflective surface coating 143; surface 120 is coated with a green and red reflective surface coating 133, and surface 152 is coated with a blue reflective surface coating 153. Alternatively, surface coatings 143 and 153 may be mirror coatings. In such an arrangement, a blue and green compound beam 187 is reflected at surface 118; a green component beam is reflected at surface 120; a blue component beam is reflected at surface 152; and a red component beam is reflected at surfaces 142 and 120.

A path length compensator 210 for correcting the difference in path length of the green component beam 184 may be provided by a first transparent plate 212 having a planar upper surface 214 attached to surface 122 and a planar lower surface 216 which intersects component beam 186, and further by a second transparent plate 218 having a planar upper surface 220 attached to surface 122 and a planar lower surface 222 positioned at the same elevation as surface 216.

Figure 8:
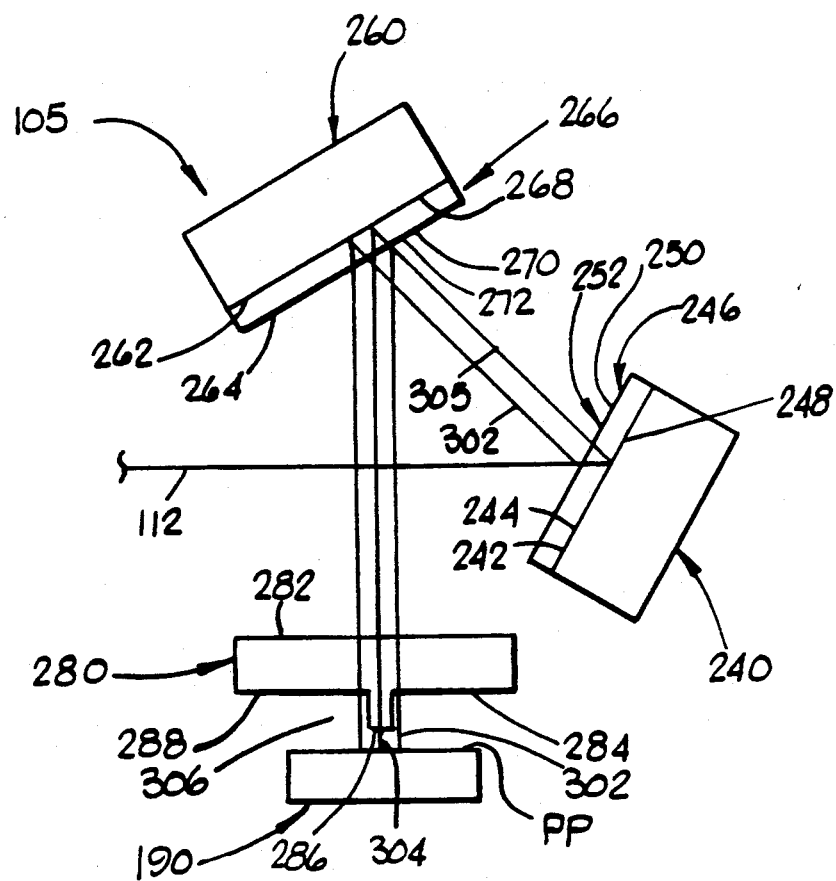
FIG. 8 is a side elevation view of a second alternative multilayered beam splitter device.

FIG. 8 illustrates another optical separator device 105 which may be substituted for optical separator device 101 shown in the color imaging assembly 100 of FIG. 6. In the embodiment of FIG. 8, a first relative thick, e.g. 2.1 mm, rigid plate 240 having a planar front surface 242 coated with red and green reflective surface coating 244 has a first thin plate 246 with a rear surface 248 and a forward surface 250 attached to the rigid plate 240 with surfaces 246 and 242 positioned in abutting relationship. Thin plate forward surface 250 is coated with a blue reflective surface coating 252. Surfaces 242, 248 and 252 are parallel.

A second relatively thick, rigid plate 260 is provided having a planar front surface 262 thereon which is coated with a blue and green reflective surface coating 264. A second thin plate 266, which may be the same thickness as first thin plate 246, is attached to the second rigid plate 260. The second thin plate comprises a rear surface 268 which abuts surface 262 and comprises a forward surface 270 which is coated with a red reflective surface coating 272. Surfaces 262, 268 and 270 are positioned in parallel relationship. A transparent compensator block 280 is provided having a planar top surface 282; a first planar bottom surface 284 adapted to intersect a red component beam, a second planar bottom surface 286 adapted to intersect a green component beam, and a third planar bottom surface 288 which is adapted to intersect a blue component beam. The optical separator device 105 acts analogously to separator 101 to separate incident polychromatic light beam 112 into red, green and blue color component beams 302, 304, 306 through reflection at the various surfaces thereof with a compound red and green component beam 305 being provided by reflection at planar surface 242 and being subsequently separated into separate red and green component beams 302, 304 at surfaces 270 and 262, respectively, etc.

Figure 9:
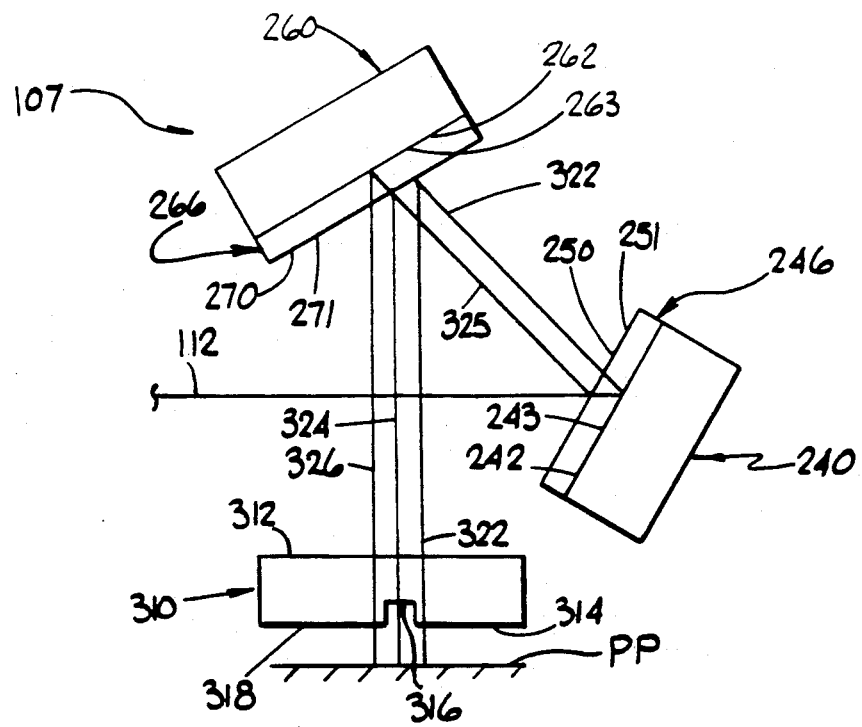
FIG. 9 is a side elevation view of a third alternative multilayered beam splitter device.

FIG. 9 illustrates an optical separating device 107 which may be substituted for the optical separating device 101 of the color imaging assembly 100 of FIG. 6. In this embodiment, the structure of the various surfaces corresponds to the compound plate structure of FIG. 8. However, the surface coatings provided are configured to reflect light in a manner corresponding to that of FIG. 7. Thus, front block surface 242 is coated with a red reflective coating 243; planar front surface 250 is coated with a blue and green reflective coating 251, second rigid plate front surface 262 is coated with a blue reflective coating 263; and front surface 270 is coated with a green and red reflective coating 271.

A compensator block 310 having a planar upper surface 312; a first planar lower surface 314 adapted to intersect a red component beam; a second planar lower surface 316 adapted to intersect a green component beam; and a third planar lower surface 318 adapted to intersect a blue component beam is provided. A red component beam is separated from the polychromatic light beam 112 and reflected to the image plane PP at surfaces 242 and 270. A green and blue compound beam 325 is separated from the combined beam 112 at surface 250. A green component beam 316 is separated from compound component beam 32 at surface 270. Blue component beam 326 is reflected at surface 262. The three component beams 322, 324, 326 provide focused, spacially separated, color component images at image plane PP.

Figure 10:
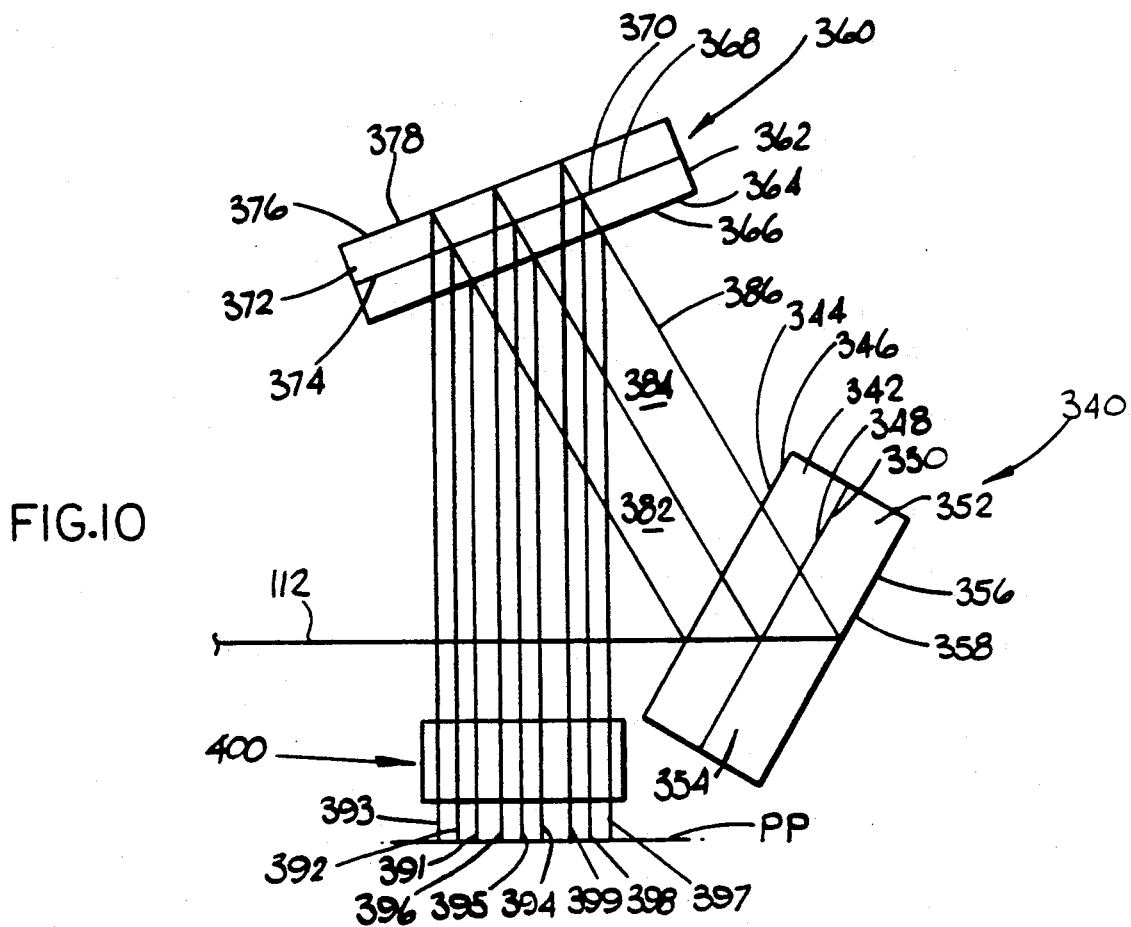
FIG. 10 is a side elevation view of a fourth alternative multilayered beam splitter device.

FIG. 10 illustrates an optical separator device which is adapted to separate a polychromatic imaging light beam 112 into first, second, third, fourth, fifth, sixth, seventh, eighth, and ninth component beams 391-399 of different spectral ranges which are positioned in parallel, spaced-apart relationship. Optical separating device 109 comprises a first composite beam splitter 340 which includes a first plate 342 of a first plate thickness having a first planar surface 344 with a surface coating 346 thereon adapted to reflect light in a first, second, and third spectral range. First plate 342 has a second planar surface 348 parallel to the first planar surface 344 having a coating 350 applied thereto which is adapted to reflect light in a fourth, fifth, and sixth spectral range. A second plate 352 is provided having the same thickness as first plate 342 and having a first planar surface portion 354 attached to surface 348. Plate 352 has a second planar surface 356 having a surface coating 358 applied thereto which is adapted to reflect light in a seventh, eighth, and ninth spectral range.

A second composite beam splitter 360 is provided comprising a first plate 362 which has a thickness one-fourth the thickness of plate 342. Plate 362 has a first planar surface 364 coated with a reflective layer which is adapted to reflect light in the first, fourth, and seventh spectral range. Plate 362 comprises a second planar surface 368 having a surface coating 370 which is adapted to reflect light in the second, fifth, and eighth spectral range. A second plate 372 having a thickness equal to that of plate 360 has a first planar surface 74 attached to surface 368 and has a second planar surface 376 which is provided with a surface coating 378 adapted to reflect light in the third, sixth, and ninth spectral ranges.

In operation, the incident polychromatic light beam 112 is separated by first composite beam splitter 340 into a first compound beam 382 having light in the first, second, and third spectral ranges; a second compound beam 384 having light in the fourth, fifth, and sixth spectral ranges, and a third compound beam 386 having light in the seventh, eighth, and ninth spectral ranges. The second beam splitter splits the first, second, and third compound beams 382, 384, 386 into first, second, and third component beams 391, 392, 393; fourth, fifth, and sixth component beams 394, 395, 296; and seventh, eight, and ninth component beams 397, 398, 399, respectively. The component beams 391-399 may be passed through an appropriate path length compensator 400 (shown schematically only) which compensates for the variations in path lengths of the various component beams such that each of the component beams is focused at image plane PP.

Innumerable other variations of the invention may be provided by providing, for example, more than two sets of parallel reflective layers and by providing various numbers of light reflective coatings on various ones of the different light reflective layers to accomplish desired component separation. For example, an arrangement may be provided wherein three separate plates each having two parallel planar surfaces thereon are provided in a three-plane array. The first plate has a first, second, third, and fourth spectral range reflective coating on its forward surface and a fifth, sixth, seventh, and eighth spectral range reflective coating on its second surface. The second plate, which receives light reflected from the first plate, has a coating which reflects the first, second, fifth, and sixth spectral ranges on its front surface and the third, fourth, seventh, and eighth spectral ranges on its rear surface. The third plate, which receives light reflected from the second plate, has a coating on its forward surface which reflects light in the first, third, fifth, and seventh spectral range and has a coating on its rear surface which reflects light in the second, fourth, sixth, and eighth spectral range. Using such an arrangement, a component beam may be split into eight, separate, parallel component beams.

The embodiment of the invention illustrated in FIGS. 5, 6 and 7 achieve a significant benefit over the prior art due to the fact that all surfaces thereof which are coated with the various light reflective coatings are surfaces of relatively thick, rigid members which may be processed very accurately to provide planar surfaces which are not subject to warping, etc. during assembly and which may be maintained in precise relationship with other coated surfaces. Such an arrangement enables optical scanners, which require separation of light into three component beams for accurate color reproduction, to be provided without resorting to use of any thin plates, and thus eliminates quality problems associated with maintaining surfaces of thin plates in an unwarped, planar condition.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An optical separator device for splitting a beam of incident polychromatic light into a plurality of spacially and spectrally separated component beams having parallel optical axes comprising:

first parallel layer means for spectrally and spacially separating said incident beam into a first plurality of component beams comprising a first plurality of parallel, spectrally selective, reflective layers including a layer adapted to reflect light in a first spectral range and a second spectral range;

second parallel layer means for further spectrally and spacially separating said first plurality of component beams into a second plurality of component beams comprising a second plurality of parallel, spectrally selective, reflective layers including a layer adapted to reflect light in said first spectral range and to transmit light in said second spectral range.

2. The invention of claim 1 comprising:

first spectrally selective, reflective layer means disposed in a first plane for reflecting light in said first spectral range and said second spectral range;

second spectrally selective, reflective layer means disposed in a second plane parallel to said first plane and spaced therefrom by a first gap distance for reflecting light in a third spectral range;

third spectrally selective, reflective layer means disposed in a third plane oriented obliquely with respect to said first and second planes for reflecting light in said second and third spectral ranges;

fourth spectrally selective, reflective layer means disposed in a fourth plane oriented parallel to said third plane and spaced therefrom by a second gap distance for reflecting light in said first spectral range.

3. The invention of claim 2 wherein said first, second and third spectral ranges each comprise a different one of red, green and blue light.

4. The invention of claim 2 wherein two of said first, second, third, and fourth spectrally selective, reflective layers are provided on two different faces of a prism.

5. The invention of claim 4 wherein said first and third layers are provided on said two different faces of said prism.

6. The invention of claim 4 wherein said second and fourth layers are provided on said two different faces of said prism.

7. The invention of claim 2 wherein said first and second layers are provided on opposite surfaces of a first plate.

8. The invention of claim 7 wherein said third and fourth layers are provided on opposite surfaces of a second plate.

9. The invention of claim 1 wherein said optical separator device comprises a portion of a color imaging assembly and wherein said incident light beam comprises an imaging light beam which is focused by an imaging lens assembly and separated by said optical device to provide spaced apart color component images of an object on a plurality of linear photosensor arrays located on a unitary image plane;

further comprising path length compensator means for refracting compensating for differences in optical path lengths of said component beams through said parallel layer means whereby each color component image is properly focused on an associated photosensor array.

10. A method for splitting a beam of incident polychromatic light into a plurality of spacially and spectrally separated component beams having parallel optical axes comprising the steps of:

spectrally and spacially separating said incident beam into a first plurality- of component beams through use of a spectrally selective, reflective layer adapted to reflect light in a first spectral range and a second spectral range;

further spectrally and spacially separating said first plurality of component beams through use of a second spectrally selective, reflective layer positioned obliquely to said first layer and which is adapted to reflect light in said first spectral range and to transmit light in said second spectral range.

11. An optical combiner device for combining a plurality of spacially and spectrally separated component beams having parallel optical axes into a single combined beam having a unitary optical axis comprising:

first parallel layer means for spectrally and spacially combining a first plurality of component beams into a second plurality of component beams comprising a first plurality of parallel, spectrally selective, reflective layers including a layer adapted to reflect light in a first spectral range and to transmit light in a second spectral range;

second parallel layer means for spectrally and spacially combining said second plurality of component beams into said combined beam comprising a second plurality of parallel, spectrally selective, reflective layers including a layer adapted to reflect light in said first spectral range and said second spectral range.

12. The invention of claim 10 comprising:

first spectrally selective, reflective layer means disposed in a first plane for reflecting light in said first spectral range and for transmitting light in said second spectral range and in a third spectral range;

second spectrally selective, reflective layer means disposed in a second plane parallel to said first plane and spaced therefrom by a first gap distance for reflecting light in said second and third spectral ranges;

third spectrally selective, reflective layer means disposed in a third plane oriented obliquely with respect to said first and second planes for transmitting light in said first and second spectral ranges and for reflecting light in said third spectral range;

fourth spectrally selective, reflective layer means disposed in a fourth plane oriented parallel to said third plane and spaced therefrom by a second gap distance for reflecting light in said first and second spectral ranges.

13. The invention of claim 12 wherein said first, second and third spectral ranges each comprise a different one of red, green and blue light.

14. The invention of claim 12 wherein two of said first, second, third, and fourth spectrally selective, reflective layers are provided on two different faces of a prism.

15. The invention of claim 14 wherein said first and third layers are provided on said two different faces of said prism.

16. The invention of claim 14 wherein said second and fourth layers are provided on said two different faces of said prism.

17. The invention of claim 12 wherein said first and second layers are provided on opposite surfaces of a first plate.

18. The invention of claim 17 wherein said third and fourth layers are provided on opposite surfaces of a second plate.

19. The invention of claim 10 further comprising path length compensator means for refracting compensating for differences in optical path lengths of said component beams through said parallel layer means.

20. A method for combining a plurality of spacially and spectrally separated component beams having parallel optical axes into a single combined beam having a unitary optical axis comprising the steps of:

spectrally and spacially combining a first plurality of component beams into a smaller second plurality of component beams through use of a first spectrally selective, reflective layer adapted to reflect light in a first spectral range and to transmit light in a second spectral range;

spectrally and spacially combining said second plurality of component beams into said single combined beam through use of a second spectrally selective, reflective layer positioned obliquely to said first layer and which is adapted to reflect light in said first spectral range and said second spectral range.

* * * * *